United States Patent

[11] 3,579,094

[72] Inventor Otto A. Jorgensen
Centerport, N.Y.

[21] Appl. No. 861,378
[22] Filed Sept. 26, 1969
[45] Patented May 18, 1971
[73] Assignee Hazeltine Corporation

[54] VOLTAGE-GENERATING APPARATUS
15 Claims, 3 Drawing Figs.

[52] U.S. Cl. .......... 323/100, 178/5.2, 307/235, 331/149
[51] Int. Cl. .......... H03k 5/00
[50] Field of Search .......... 323/16, 22 (T), 100; 178/5.2 (A), (Cursory); 307/235; 331/112, 149; 328/146

[56] References Cited

UNITED STATES PATENTS

| | | | |
|---|---|---|---|
| 2,927,279 | 3/1960 | Smith-Vaniz, Jr. | 328/146X |
| 2,971,433 | 2/1961 | Akin | 331/112X |
| 3,387,147 | 6/1968 | Radwan | 331/112X |
| 3,493,782 | 2/1970 | Georgi | 307/235 |

*Primary Examiner*—James D. Trammell
*Assistant Examiner*—A. D. Pellinen
*Attorney*—Kenneth P. Robinson

ABSTRACT: Apparatus for generating a DC voltage whose amplitude is controlled in accordance with variations in the amplitude of supplied control pulses. In one embodiment a DC control signal is developed whose amplitude varies in proportion to variations in the amplitude of a supplied DC reference signal and a pulse-type difference signal in which the amplitude of each pulse is representative of the difference between the amplitude of corresponding supplied control pulses and an additional supplied DC reference signal. The control signal is coupled to a DC power supply for controlling the output voltage in accordance with variations in the amplitude of the supplied control pulses.

Patented May 18, 1971 3,579,094

VOLTAGE-GENERATING APPARATUS

BACKGROUND OF THE INVENTION

This invention relates to voltage-generating apparatus and more particularly to those apparatus which develop voltages of controllable amplitude.

In systems of various types it is often desired to have particular system units which are responsive to variations in system characteristics such as system gain and the like. These variations may be due to any number of either desirable or undesirable factors. In feedback systems, for example, variations in the overall system gain are undesirable and to be compensated for. In other systems, such as image-scanning systems of the type described in U.S. Pat. No. 3,002,048, patented Sept. 26, 1961 and assigned to Hazeltine Research, Inc., quantities such as those representing the intensity-gain product of a light-source-detection combination are to be maintained at prescribed levels. Many of the foregoing systems provide pulses whose amplitudes are representative of the particular quantities to be maintained or controlled. A DC supply voltage responsive to such pulses could thus be utilized in the control of the foregoing quantities.

SUMMARY OF THE INVENTION

It is therefore an object of the present invention to provide a new and improved DC voltage generating apparatus; DC voltage generating apparatus responsive to supplied control pulses; and voltage-generating apparatus whose amplitude is controlled in accordance with variations in the amplitude of supplied control pulses.

In accordance with the present invention there is provided apparatus for generating a DC voltage whose amplitude is controlled in a accordance with variations in the amplitude of supplied control pulses, the apparatus comprising first means responsive to supplied control pulses and a first supplied reference signal for comparing the amplitude of each supplied control pulse with the amplitude of the first reference signal for developing a pulse-type difference signal in which the amplitude of each pulse is representative of the difference between the amplitude of a corresponding one of the supplied control pulses and the first reference signal amplitude. The apparatus also includes second means responsive to the difference signal for developing a substantially DC power supply control signal whose amplitude varies in proportion to variations in the amplitude of the difference signal pulses and power supply means responsive to the DC control signal for developing a substantially DC output voltage whose amplitude is proportional to the amplitude of the control signal so that the amplitude of the output voltage is controlled in accordance with variations in the amplitude of the supplied control pulses.

For a better understanding of the present invention, together with other and further objects thereof, reference is had to the following description taken in connection with the accompanying drawing and its scope will be pointed out in the appended claims.

DESCRIPTION OF THE INVENTION

Figure 1:
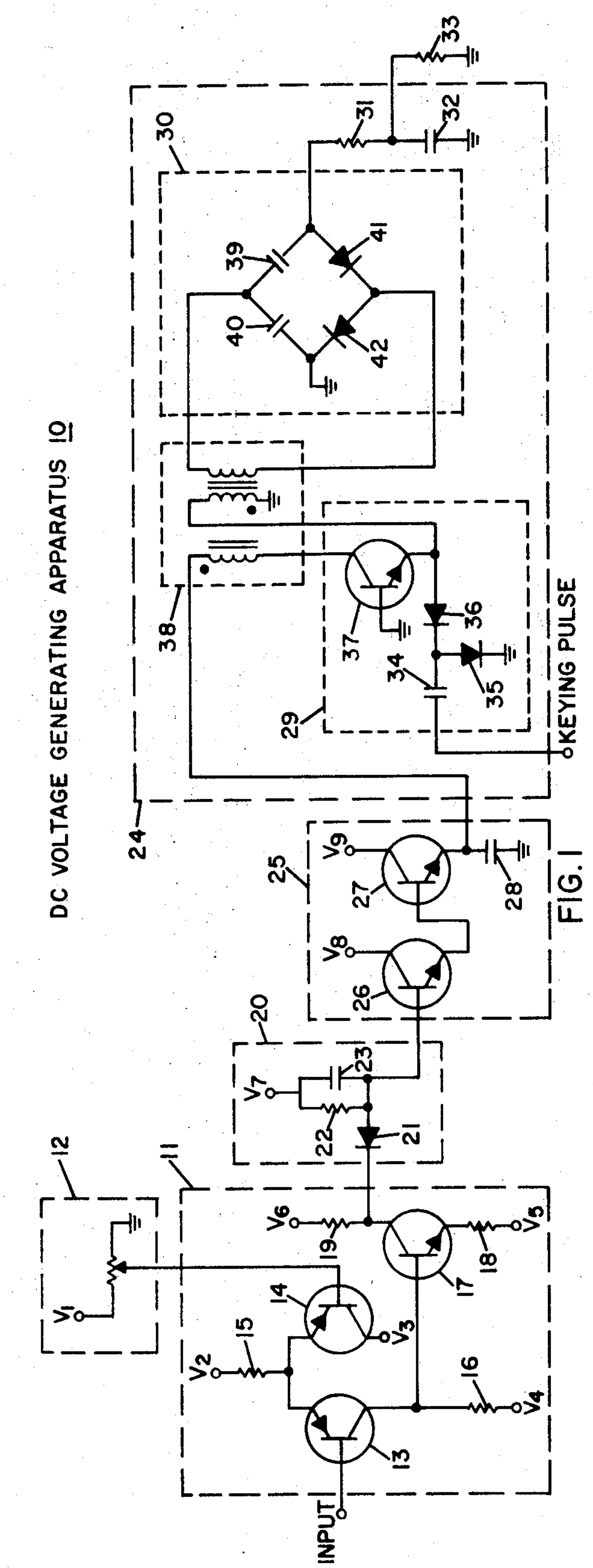
FIG. 1 is a circuit diagram of an embodiment of a voltage-generating apparatus constructed in accordance with the invention whose amplitude is controlled in accordance with variations in the amplitude of received reference pulses.
Figure 2:
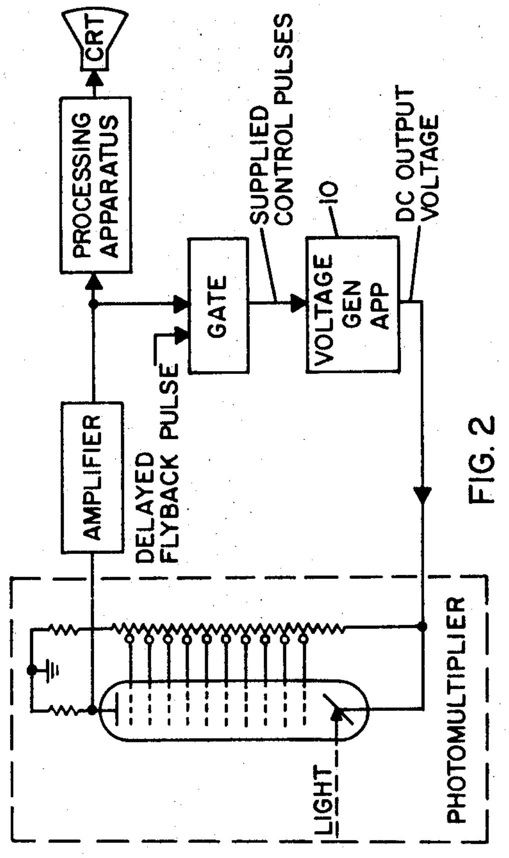
FIG. 2 depicts a voltage-generating apparatus such as the apparatus of FIG. 1, utilized in an image scanning system configuration.

There is shown in FIG. 1 a voltage-generating apparatus 10 constructed in accordance with the invention. In FIG. 2 apparatus 10 is shown in an image-scanning system having a photomultiplier, amplifiers, processing apparatus and gating circuitry such as described in the above-mentioned U.S. Pat. No. 3,002,048. Referring now to FIG. 1, apparatus 10 generates a DC voltage whose amplitude is proportional to variations in the amplitude of supplied control pulses. The amplitude is actually inversely proportional to the variations. However, as will be discussed more fully below with reference to FIG. 1*a*, a DC voltage may likewise be developed whose amplitude is directly proportional thereto.

DETAILED DESCRIPTION OF THE CIRCUIT OF FIG. 1

FIG. 1 illustrates apparatus 10 constructed in accordance with the present invention. Apparatus 10 includes first means, shown as difference amplifier 11, responsive to a supplied control pulse and to a first reference signal supplied from adjustable source 12, shown as a potentiometer connected between reference potential $V_1$ and ground.

Difference amplifier 11 includes a first transistor 13 to whose base the control pulses are supplied and whose emitter is coupled to the emitter of a second transistor 14 and via an emitter resistor 15 to a source of potential $V_2$. The aforementioned first reference signal is supplied to the base of second transistor 14 whose collector is coupled to another reference potential, $V_3$. At the collector of first transistor 13 which is shown coupled via a collector resistor 16 to a potential $V_4$, a series of pulses are developed wherein the amplitude of each pulse is directly proportional to the difference between the amplitude of the first supplied reference signal and the amplitude of a corresponding one of the supplied control pulses.

If additional amplification of the developed pulses is desired, it may be provided by appropriate biasing of first transistor 13. Also, difference amplifier 11 may include an additional amplifier means such as transistor 17 whose base is coupled to the collector of first difference transistor 13 and whose emitter and collector are connected via resistors 18 and 19 to sources of reference potential $V_5$ and $V_6$, respectively. The combination of transistor 17 and resistors 18 and 19 provides a predetermined gain approximately equal to the ratio of resistor 19 to resistor 18 for amplifying the developed pulses provided at the collector of first difference transistor 13. In these instances the difference signal comprises a series of pulses in which the amplitude of each pulse is substantially equal to the difference, multiplied by a predetermined factor, of the first supplied reference signal amplitude and the amplitude of a corresponding one of the supplied control pulses.

Additionally included in the voltage-generating apparatus 10 of FIG. 1, is second means 20 responsive to the difference signal and to a second supplied reference signal, shown as DC source $V_7$. Second means 20 develops a substantially DC control signal for controlling the power supply and whose amplitude varies in proportion to the amplitude of the difference signal pulses and thus proportional to variations in the amplitude of the supplied control pulses. Means 20 includes a unidirectional device, diode 21 and an integrator circuit, resistance 22 and capacitance 23 in parallel combination between a second supplied reference signal, DC voltage $V_7$, and the anode of diode 21. The cathode of diode 21 is connected to the output of amplifier transistor 17 for receiving the difference signal, and the substantially DC control signal is developed at the anode of diode 21. The DC control signal is representative of the combined amplitudes of the supplied second reference signal and the last received difference signal pulse. In particular, the control signal developed has an amplitude representative of the difference in the amplitude of the difference signal and the second reference signal $V_7$ and thus has an amplitude which varies in inverse proportion to the amplitude of the difference signal pulses.

The control signal is supplied to power supply means 24 for generating a substantially DC output voltage whose amplitude is proportional to the amplitude of the control signal so that the amplitude of the output voltage is controlled in accordance with variations in the amplitude of the received reference pulses. In FIG. 1, the control signal is shown coupled to the power supply means 24 via an emitter follower configuration 25 having a first transistor 26 and a second transistor 27 whose collectors are coupled to reference potentials $V_8$ and $V_9$, respectively. The emitter of second transistor 27 which is coupled to ground potential via capacitor 28 and to power supply means 24 supplies the control signal thereto. In various other configurations, of course the emitter-follower or like units may be omitted in which event the anode of diode 21 may be connected directly to power supply means 24.

The amplitude of the output voltage developed by power supply means 24 is inversely proportional to variations in the amplitude of the supplied control pulses. However, as later described with reference to FIG. 1*a*, this voltage may be developed in direct proportion thereto if desired.

The particular power supply means 24 shown in FIG. 1 includes a multivibrator blocking oscillator 29, and a bridge rectifier-doubler unit 30. Blocking oscillators develop pulse-type output signals and usually are referred to as either monostable (responsive to an external trigger or keying pulse such as oscillator 25 of FIG. 1) or astable (free-running). A convenient trigger pulse, as discussed more fully below, would be pulses in phase or synchronous with the supplied control pulses. If appropriate, they may even be the control pulses themselves.

Bridge rectifier and doubler unit 30 is responsive to oscillator 29 pulses and develops a rectified or DC voltage which is supplied to a terminal of a smoothing resistance 31 whose other terminal is connected to a reference potential or ground, through a smoothing capacitance 32 for providing additional smoothing and filtering in developing the final DC output voltage at the junction of units 31 and 32. For convenience, this junction is shown connected to a load resistance 33.

Referring now in detail to blocking oscillator 29, this unit includes a trigger input capacitance 34 connected to the anode of first oscillator diode 35 whose cathode is connected to both a ground reference potential and to the cathode of a second oscillator diode 36 whose anode is connected to the emitter of a grounded or common base oscillator transistor 37. The collector of the common base transistor 37 is connected to a first portion of the primary winding of transformer 38. The emitter of transistor 27 is connected to this portion for supplying the DC control signal thereto. The second or other portion of the primary winding of transformer 38 is shown connected between a reference potential, ground, and the emitter terminal of common base transistor 37. The secondary winding of transformer 38 at which the pulse-type oscillator output signal is developed is connected to bridge rectifier-doubler 30. In particular, one terminal of transformer 38 is connected to the junction in unit 30 of first capacitance 39 and second capacitance 40. The other terminal of the secondary winding of transformer 38 is connected to the junction of two diodes in unit 30; in particular, the junction of the cathode of a first diode 41 and the anode of a second diode 42. The cathode of the second diode 42 is connected to both the remaining unconnected end of capacitance 40 and to a reference potential, ground, while the anode of first diode 41 is connected to the remaining unconnected end of capacitance 39, thereby completing the bridge arrangement of unit 30. Also, the last-mentioned end of capacitance 39 is connected to the previously mentioned smoothing resistance 31.

OPERATION OF THE CIRCUIT OF FIG. 1

Apparatus 10 generates a DC voltage whose amplitude is controlled in accordance with variations in the amplitude of supplied control pulses. In the embodiment shown it is assumed that these pulses are serially or sequentially supplied to the base of first transistor 13 of difference amplifier 11 where the pulse amplitude is compared with the amplitude of the substantially DC first supplied reference signal. These pulses, for example, may be similar to the periodic reference pulses generated by the scanning light in an image-scanning system such as described in the previously referenced patent assigned to Hazeltine Research, Inc.

In the apparatus 10 of FIG. 1, the amplitude of the first reference signal is selected such that the amplitude of the supplied control pulse will usually exceed the amplitude of the first supplied reference signal thereby causing first transistor 13 to conduct. However, with appropriate modification other configurations such as those which cause second difference transistor 14 to conduct, may be utilized. In the configuration shown, a pulse will be generated at the collector of first transistor 13 each time a control pulse is received which causes transistor 13 to conduct. The amplitude of this pulse if substantially equal to the difference in amplitude between the supplied control pulse and the amplitude of the first supplied reference signal. Since the supplied control pulses are serially received, a series of pulses, will be developed each one of which corresponds to the difference between the supplied control pulse amplitude and the amplitude of the first supplied reference signal 12. The amplitude of the developed pulses may be relatively small and instead of these pulses comprising the difference signal pulses, it is therefore often convenient to increase or otherwise modify the amplitude of all the pulses so developed by a predetermined amount or scale factor to develop modified pulses which comprise the difference signal pulses. The pulses to be modified are supplied to the base of amplifier transistor 17 which provides substantially constant gain for developing the modified difference signal pulses. Selection of resistances 18 and 19 provide the suitable amplification or gain. Amplification of this type may be desirable, for example, if apparatus 10 generates a DC voltage which is to be utilized in various feedback systems so that small difference signal amplitudes can be amplified predetermined amounts thereby varying the amount of feedback in the system. Likewise, first transistor 13 may also provide a predetermined gain which, for convenience, can be considered as part of the gain provided by transistor 17.

The difference signal regardless of whether transistor 17 and resistances 18 and 19 are included in apparatus 10 or not, consists of a series of pulses since in the FIG. 1 embodiment there is no conduction of first transistor 13 during the period when no control pulses are supplied.

The difference signal pulses are supplied to the cathode of diode 21 of second means 20. Prior to reception of a pulse, the anode of diode 21 is at a voltage level substantially equal to the magnitude of reference potential $V_7$, some selected positive value. Since the voltage across diode 21 cannot change instantaneously a negative-going difference pulse supplied to the cathode of diode 21 causes the voltage at the anode of diode 21 to decrease by an amount substantially equal to the amplitude or magnitude of the pulse supplied to the cathode. After termination of a difference-signal pulse, the cathode of diode 21 rapidly returns to its initial value which is substantially equal to the reference potential $V_6$ since first transistor 13 does not conduct during this period. However the anode of diode 21 cannot so return since the magnitudes of resistance 22 and capacitance 23, which elements comprise the integrator circuit, provide a time constant which does not permit the charge across capacitance 23 (substantially equal to the magnitude of the difference pulse amplitude) to decrease appreciably in the time interval between supplied control pulses (and thus the time interval between difference signal pulses). Therefore, a rectified or substantially DC control signal is provided at the output of second means 20. The amplitude of the control signal is substantially equal to the amplitude of the reference voltage $V_7$ minus the amplitude of the last received difference signal pulse.

It should be noted that each time a control pulse is supplied which causes first difference transistor 13 to conduct, an additional difference signal pulse is developed and supplied to the cathode of diode 21, thereby adjusting the control signal voltage amplitude to that of the reference potential $V_7$ minus the amplitude of the next developed difference signal pulse.

Therefore, as each additional difference pulse is supplied, if different in amplitude from the preceding supplied difference pulse, the DC control signal amplitude will vary by an amount substantially equal to the difference in amplitude between the current difference signal pulse and the last received one.

The developed DC control signal is supplied to power supply means 24 through emitter-follower transistors 26 and 27. As previously discussed, unit 25 merely provides an appropriate impedance level for the DC control signal supplied to power supply means 24. Therefore, depending on the particular circuit configuration, the output of second means 20 might be connected directly to power supply means 24.

Power supply means 24 is responsive to this DC control signal. In particular, the control signal is supplied as a bias to the first portion of the primary winding of transformer 38. Each time a trigger or keying pulse is received at trigger input 43, blocking oscillator 29 is activated and develops a high-voltage pulse across the secondary terminal of transformer 38. The amplitude of the pulse is determined by the amplitude of the DC control signal connected to the primary of transformer 38, as well as the ratio between primary and secondary. Transformer 34 is shown operated in the step up mode. Although power supply means 24 includes the monostable blocking oscillator 29 in a common or grounded base configuration, other configurations or circuit types may be employed as appropriate. For example, although blocking oscillator 29 operates such that transistor 37 saturates, nonsaturating configurations may be employed. Similarly, common or grounded emitter configurations are also well known to those skilled in the art. Likewise, if it were deemed unnecessary to use an external trigger or synchronization pulse at terminal 40, an astable device could be employed. In addition, various DC converters or other appropriate units might be substituted for blocking oscillator 29.

Referring again to the output pulse provided at the secondary terminal of transformer 38 of oscillator 29, the amplitude of this pulse will ordinarily be substantially larger than, although it is proportional to, the amplitude of the DC control signal. However, it is nonetheless a pulse and bridge rectifier unit 30 rectifies the developed oscillator pulse to provide a substantially DC voltage. Moreover the aforementioned bridge rectifier unit 30 also develops a DC voltage whose amplitude is substantially twice the amplitude of the aforementioned pulse. This doubling is provided primarily for convenience since a high output voltage is desired. However, other configurations may be used instead. Moreover, during operation, the base-to-collector voltage that might be developed across transistor 37 could possibly exceed the prescribed collector-to-base rating of the transistor 37. A diode would ordinarily be connected across the primary winding to prevent this possible voltage breakdown of transistor 37. However, the elements of unit 30 conveniently also provide this safety feature so that a separate breakdown avoidance diode is not required.

As previously stated, a substantially DC voltage is developed at the output of bridge rectifier unit 30. This voltage is supplied to series-connected resistance 31 and capacitance 32 for additional smoothing and ripple elimination. The DC power supply output voltage is provided at the junction of resistance 31 and capacitance 32. The amplitude of this substantially DC output voltage is proportional to the amplitude of the developed DC control signal and is thus controlled in accordance with variations in the amplitude of the supplied control pulses. In particular, the output voltage amplitude in the FIG. 1 apparatus 10 is inversely proportional to variations in amplitude of the supplied control pulses.

While applicant does not wish to be limited to any particular set of circuit constants, the following have proved useful in the apparatus 10 of FIG. 1, particularly in instances wherein said DC output voltage is supplied to the dynode (electrode) of a photomultiplier tube utilized in image-scanning systems of the type described in the aforementioned U.S. patent and wherein the control pulses supplied to apparatus 10 are representative of the intensity-gain product described therein, having a pulse width of approximately 10 microseconds and a pulse repetition rate of approximately 15,750 Hz.

Transistors 13, 14—2N4125.
Resistance 15—2700 ohms.
Resistance 16—4700 ohms.
Transistor 17—2N4123.
Resistance 18—1000 ohms.
Resistance 19—2700 ohms.
Diode 21—1N914.
Resistance 22—100,000 ohms.
Capacitor 23—1 microfarad.
Transistor 26—2N4123.
Transistor 27—2N3055.
Capacitor 28—10 microfarads.
Resistance 31—10,000 ohms.
Capacitor 32—.1 microfarad.
Capacitor 34—.47 microfarad.
Diode 35'—1N914.
Diode 36—1N914.
Transistor 37—2N5240.
Capacitor 39—.1 microfarad.
Capacitor 40—.1 microfarad.
Diode 41—MR2266.
Diode 42—MR2266.
Resistance 33 (Dynode resistance)—500,000 ohms.

Figure 1A:
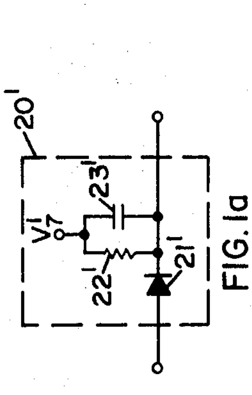
FIG. 1*a* depicts an alternative arrangement, in accordance with the invention, for one of the units of the apparatus shown in FIG. 1.

DESCRIPTION AND OPERATION OF THE CIRCUIT OF FIG. 1*a*

Unit 20' depicted in FIG. 1*a* is an alternative configuration for unit 20 of FIG. 1 and may be substituted therefore in a voltage-generating apparatus in accordance with the invention. Unit 20' contains diode 21', resistance 22' and capacitance 23', corresponding to like numbered elements in unit 20. However, diode 21' is connected such that its anode and cathode are reversed relative to the respective connections of diode 21. In a voltage-generating apparatus having unit 20' instead of unit 20, each difference signal pulse is supplied to the anode of diode 21'. The control signal amplitude developed at the output of unit 20' is substantially equal to the sum of the amplitude of the difference signal pulse and the reference potential $V_7'$ rather than the difference thereof as was described with reference to unit 20. Thus, the particular unit included in the second means, unit 20 or unit 20', depends upon the nature of the control signal and therefore of the DC output voltage to be developed. In a voltage-generating apparatus having unit 20', said second means comprises means for developing a substantially DC control signal having an amplitude which varies in direct proportion to variations in the amplitude of difference signal pulses. This is just the opposite of the previously described voltage-generating apparatus which includes unit 20 since in the latter instance said second means comprises means for developing a substantially DC control signal having an amplitude which varies in inverse proportion to variations in the amplitude of the difference signal pulses. Thus, utilizing unit 20' instead of unit 20 the voltage-generating apparatus will provide a DC output voltage whose amplitude is directly proportional to the amplitude variations of the supplied control pulses. In other respects, the operation of voltage-generating apparatus with unit 20' substituted for unit 20 is substantially the same as described with reference to apparatus 10 of FIG. 1.

While there have been described what are at present considered to be the preferred embodiments of this invention, it will be obvious to those skilled in that art that various changes and modifications may be made therein without departing from the invention and it is, therefore, aimed to cover all such changes and modifications as fall within the true spirit and scope of the invention.

I claim:

1. Apparatus for generating a DC voltage whose amplitude is controlled in accordance with variations in the amplitude of supplied control pulses, said apparatus comprising:

first means responsive to supplied control pulses and a first supplied reference signal for comparing the amplitude of each supplied control pulse with the amplitude of said first reference signal for developing a pulse-type difference signal in which the amplitude of each pulse is representative of the difference between the amplitude of a corresponding one of the supplied control pulses and the first reference signal amplitude;

second means responsive to said difference signal for developing a substantially DC power supply control signal whose amplitude varies in proportion to variations in the amplitude of said difference signal pulses;

and power supply means responsive to said DC control signal for developing a substantially DC output voltage whose amplitude is proportional to the amplitude of said control signal so that the amplitude of the output voltage is controlled in accordance with variations in the amplitude of the supplied control pulses.

2. Voltage-generating apparatus as described in claim 1, wherein said second means comprises means for developing a substantially DC control signal having an amplitude which varies in inverse proportion to variations in the amplitude of the difference signal pulses.

3. Voltage-generating apparatus as described in claim 1, wherein said second means comprises means for developing a substantially DC control signal having an amplitude which varies in direct proportion to variations in the amplitude of said difference signal pulses.

4. Apparatus for generating a DC voltage whose amplitude is controlled in accordance with variations in the amplitude of supplied control pulses, said apparatus comprising:

first means responsive to supplied control pulses and first supplied reference signal for comparing the amplitude of each supplied control pulse with the amplitude of said first reference signal for developing a pulse-type difference signal in which the amplitude of each pulse is representative of the difference between the amplitude of a corresponding one of the supplied control pulses and the first reference signal amplitude;

second means responsive to said difference signal and a second supplied reference signal for developing a substantially DC power supply control signal whose amplitude is representative of the combined amplitudes of said second supplied reference signal and the last supplied difference signal pulse;

and power supply means responsive to said DC control signal for developing a substantially DC output voltage whose amplitude is proportional to the amplitude of said control signal so that the amplitude of the output voltage is controlled in accordance with variations in the amplitude of the supplied control pulses.

5. Voltage-generating apparatus as described in claim 4, wherein said second means comprises means for developing a substantially DC control signal whose amplitude is substantially equal to the difference between said second supplied reference signal amplitude and the amplitude of the last supplied difference signal pulse.

6. Voltage-generating apparatus as described in claim 4, wherein said second means comprises means for developing a substantially DC control signal whose amplitude is substantially equal to the sum of the second supplied reference signal amplitude and the amplitude of the last supplied difference signal pulse.

7. Voltage-generating apparatus as described in claim 4, wherein said first supplied reference signal is a substantially DC signal and said first means includes a difference circuit responsive to the supplied control pulses and the first supplied reference signal for developing a series of pulses in which the amplitude of each pulse is directly proportional to the difference between the amplitude of the first reference signal and the amplitude of a corresponding one of the supplied control pulses.

8. Voltage-generating apparatus as described in claim 4, wherein said first supplied reference signal is a substantially DC signal and said first means includes a difference circuit responsive to the supplied control pulses and the first supplied reference signal for developing a series of pulses in which the amplitude of each pulse is directly proportional to the difference between the amplitude of the first reference signal and the amplitude of a corresponding one of the supplied control pulses, and said first means further includes amplifier means responsive to the developed series of pulses for modifying the amplitude of said pulses so that said difference signal comprises a series of modified pulses in which the amplitude of each pulse is substantially equal to the difference, multiplied by a factor determined by the predetermined gain of the amplifier means, of the first supplied reference signal amplitude and the amplitude of a corresponding one of said supplied control pulses.

9. Voltage-generating apparatus as described in claim 4, wherein said second means includes a unidirectional device and an integrator circuit, and said difference signal is coupled to a first terminal of said unidirectional device and said integrator circuit is coupled between a second supplied DC reference signal and a second terminal of said device.

10. Voltage-generating apparatus as described in claim 9, wherein said unidirectional device is a diode to whose cathode is coupled the difference signal and at whose anode is developed the DC control signal having an amplitude substantially equal to the difference between the second supplied reference signal amplitude and the amplitude of the last supplied difference signal pulse.

11. Voltage-generating apparatus as described in claim 9, wherein said unidirectional device is a diode to whose anode is coupled the difference signal and at whose cathode is developed the DC control signal having an amplitude substantially equal to the sum of the second supplied reference signal amplitude and the amplitude of the last supplied difference signal pulse.

12. Voltage-generating apparatus as described in claim 4, wherein said power supply means includes a blocking oscillator having a transformer, said control signal is coupled to said transformer for controlling the amplitude of pulses developed by said oscillator, and the developed pulses are supplied to a bridge rectifier circuit at whose output the DC output voltage is developed.

13. Apparatus for generating a DC voltage whose amplitude is controlled in accordance with variations in the amplitude of supplied control pulses, said apparatus comprising:

first means responsive to received reference pulses and a first supplied reference signal of predetermined amplitude for comparing the amplitude of each supplied control pulse with the amplitude of said first reference signal for developing a pulse-type difference signal in which the amplitude of each pulse is representative of the difference between the amplitude of a corresponding one of the supplied control pulses and the first reference signal amplitude;

a diode having an anode to which said difference signal is coupled;

an integrator circuit comprising a resistance and a capacitance in parallel combination, having a first terminal coupled to a second supplied reference signal of predetermined amplitude and a second terminal coupled to the cathode of said diode for developing, at said second terminal, a substantially DC control signal having an amplitude substantially equal to the sum of the second reference signal amplitude and the amplitude of the last supplied difference signal pulse;

a blocking oscillator including a transformer having a primary terminal to which is coupled said DC control signal; and a bridge rectifier circuit coupled to the secondary terminal of said transformer for providing a substantially DC output voltage whose amplitude is directly proportional to the amplitude of the DC control signal so that the amplitude of the output voltage is directly proportional to variations in the amplitude of the supplied control pulses.

14. Apparatus usable in image scanning systems for generating a DC voltage whose amplitude is controlled in accordance with variations in the amplitude of supplied control pulses representative of the intensity-gain product of the light-source-detector combination for use in compensating for unwanted variations in the intensity-gain product, said apparatus comprising:

first means responsive to supplied control pulses and a first supplied reference signal of predetermined amplitude for comparing the amplitude of each supplied control pulse with the amplitude of said first reference signal for developing a pulse-type difference signal in which the amplitude of each pulse is representative of the difference between the amplitude of a corresponding one of the supplied control pulses and the first reference signal amplitude;

a diode having a cathode to which the difference signal is coupled;

an integrator circuit comprising a resistance and a capacitance in parallel combination, having a first terminal coupled to a second supplied reference signal of predetermined amplitude and a second terminal coupled to the anode of said diode for developing, at said second terminal, a substantially DC control signal having an amplitude substantially equal to the difference between the second reference signal amplitude and the amplitude of the last supplied difference signal pulse;

a blocking oscillator including a transformer having a primary terminal to which is coupled said DC control signal; and a bridge rectifier circuit coupled to the secondary terminal of said transformer for providing a substantially DC output voltage whose amplitude is directly proportional to the amplitude of said DC control signal so that the amplitude of the output voltage is inversely proportional to variations in the amplitude of the supplied control pulses.

15. A voltage-generating apparatus as described in claim 14, wherein said blocking oscillator is a monostable blocking oscillator keyed by received trigger pulses which are substantially in phase with said received reference pulses so that the output voltage amplitude is controlled in synchronism to the supplied control pulses.